(12) United States Patent
Werner et al.

(10) Patent No.: US 7,617,185 B2
(45) Date of Patent: *Nov. 10, 2009

(54) METHODS AND SYSTEMS FOR PROVIDING A VISUALIZATION GRAPH

(75) Inventors: Horst Werner, Rettigheim (DE); Joerg Beringer, Frankfurt (DE); Michael Hatscher, Osnabruck (DE)

(73) Assignee: SAP AG, Walldorf (DE)

( * ) Notice: Subject to any disclaimer, the term of this patent is extended or adjusted under 35 U.S.C. 154(b) by 301 days.

This patent is subject to a terminal disclaimer.

(21) Appl. No.: 10/927,458

(22) Filed: Aug. 27, 2004

(65) Prior Publication Data

US 2005/0108217 A1    May 19, 2005

(30) Foreign Application Priority Data

Aug. 29, 2003  (EP) .................................. 03077697
Nov. 14, 2003  (EP) .................................. 03078586

(51) Int. Cl.
G06F 17/30  (2006.01)
G06F 17/00  (2006.01)

(52) U.S. Cl. ................................ 707/3; 707/1; 707/102

(58) Field of Classification Search ............... 707/1–47, 707/100–102, 104.1, 104.14; 382/224–227; 715/853–854, 738, 962, 967; 345/440, 853, 345/619, 650, 676, 689

See application file for complete search history.

(56) References Cited

U.S. PATENT DOCUMENTS 5,590,250 A    12/1996  Lamping et al.
5,619,632 A    4/1997   Lamping et al.
5,740,440 A *  4/1998   West ............................ 717/125
6,144,962 A    11/2000  Weinberg et al.
6,154,213 A    11/2000  Strausfeld et al.
6,154,220 A    11/2000  Prakriya et al.

(Continued)

FOREIGN PATENT DOCUMENTS

| EP | 1050829 A2 | 11/2000 |
| WO | WO 92/11724 | * 7/1992 |
| WO | WO 01/88751 | * 11/2001 |
| WO | WO 02/069192 | 9/2002 |
| WO | WO 03/069506 | 8/2003 |
| WO | WO 2007/062885 | 6/2007 |

OTHER PUBLICATIONS

Fluit et al. ("Ontology-based Information Visualisation", Springer Verlag, 2002, retrieved from http://www.cs.vu.nl/~frankh/abstracts/VSW02.html, on Jan. 18, 2007).*

(Continued)

*Primary Examiner*—Srirama Channavajjala
(74) *Attorney, Agent, or Firm*—Finnegan, Henderson, Farabow, Garrett & Dunner, LLP (57) ABSTRACT

A visualization graph is provided on a computer by storing data corresponding to a plurality of entities and/or nodes, wherein a semantic net includes the entities and/or nodes and wherein the entities and/or nodes are linked to each other by a plurality of relations. A query is generated and performed on the data. Data is output in the form of a visualization graph representing the results of the query, wherein the graph has a focus entity or node defined by a user or the query. Context information is used to determine at least one entity and/or node to be output in the results that is indirectly related to the focus entity or node.

13 Claims, 9 Drawing Sheets

U.S. PATENT DOCUMENTS

| | | | |
|---|---|---|---|
| 6,216,134 B1 | | 4/2001 | Heckerman et al. |
| 6,266,805 B1 | * | 7/2001 | Nwana et al. ............... 717/104 |
| 6,285,951 B1 | * | 9/2001 | Gaskins et al. ............. 701/209 |
| 6,356,285 B1 | * | 3/2002 | Burkwald et al. ........... 715/853 |
| 6,369,819 B1 | * | 4/2002 | Pitkow et al. ............... 345/440 |
| 6,373,484 B1 | * | 4/2002 | Orell et al. .................. 345/420 |
| 6,434,556 B1 | | 8/2002 | Levin et al. |
| 6,480,843 B2 | | 11/2002 | Li |
| 6,556,983 B1 | | 4/2003 | Altschuler et al. |
| 6,583,794 B1 | | 6/2003 | Wattenberg |
| 6,646,652 B2 | | 11/2003 | Card et al. |
| 6,654,761 B2 | | 11/2003 | Tenev et al. |
| 6,714,936 B1 | * | 3/2004 | Nevin, III .................. 707/102 |
| 6,792,400 B2 | | 9/2004 | Alden et al. |
| 6,795,825 B2 | | 9/2004 | Rishe |
| 6,868,525 B1 | | 3/2005 | Szabo |
| 6,888,548 B1 | | 5/2005 | Gallivan |
| 6,901,555 B2 | * | 5/2005 | Hida et al. .................. 715/734 |
| 6,981,228 B1 | | 12/2005 | Chen et al. |
| 7,089,266 B2 | | 8/2006 | Stolte et al. |
| 7,167,865 B1 | | 1/2007 | Tharp et al. |
| 7,203,701 B1 | * | 4/2007 | Packebush et al. ....... 707/103 Y |
| 7,421,665 B2 | * | 9/2008 | Molesky et al. ............ 715/854 |
| 7,468,727 B2 | * | 12/2008 | Wong et al. ................ 345/440 |
| 2002/0087275 A1 | | 7/2002 | Kim et al. |
| 2002/0130907 A1 | | 9/2002 | Chi et al. |
| 2002/0133392 A1 | | 9/2002 | Angel et al. |
| 2002/0154175 A1 | | 10/2002 | Abello et al. |
| 2002/0158918 A1 | | 10/2002 | Feibush et al. |
| 2002/0196292 A1 | * | 12/2002 | Itoh et al. ................... 345/853 |
| 2003/0011601 A1 | | 1/2003 | Itoh et al. |
| 2003/0085931 A1 | * | 5/2003 | Card et al. .................. 345/853 |
| 2003/0167324 A1 | | 9/2003 | Farnham et al. |
| 2003/0220928 A1 | | 11/2003 | Durand et al. |
| 2004/0024533 A1 | * | 2/2004 | Ohta .......................... 702/19 |
| 2004/0030741 A1 | | 2/2004 | Wolton et al. |
| 2004/0059521 A1 | * | 3/2004 | Han et al. ................... 702/19 |
| 2004/0088678 A1 | * | 5/2004 | Litoiu et al. ................ 717/104 |
| 2004/0111255 A1 | * | 6/2004 | Huerta et al. ............... 704/10 |
| 2004/0113953 A1 | | 6/2004 | Newman |
| 2004/0133433 A1 | * | 7/2004 | Lee et al. .................... 705/1 |
| 2004/0150644 A1 | * | 8/2004 | Kincaid et al. ............. 345/440 |
| 2004/0243938 A1 | * | 12/2004 | Weise et al. ................ 715/526 |
| 2005/0116953 A1 | | 6/2005 | Liongosari et al. |
| 2006/0037019 A1 | | 2/2006 | Austin et al. |
| 2006/0044319 A1 | | 3/2006 | Molesky et al. |
| 2006/0106847 A1 | | 5/2006 | Eckardt et al. |
| 2007/0124291 A1 | | 5/2007 | Hassan et al. |

OTHER PUBLICATIONS

John Lamping, et al. "A Focus+Context Technique Based on Hyperbolic Geometry for Visualizing Large Hierarchies", Proceedings of the ACM SIGCHI Conference on Human Factors in Computing Systems, Denver, May 1995, ACM., pp. 1-8.*

Jason L. Baumgartner, et al. "Roget2000: A 2D Hyperbolic Tree Visualization of Roget's Thesaurus", SPIE conference on Visualization and data analysis, Jan. 2002.*

U.S. Appl. No. 10/927,313, filed Aug. 27, 2004, entitled "Methods and Systems for Providing a Visualization Graph."

U.S. Appl. No. 10/927,315, filed Aug. 27, 2004, entitled "Methods and Systems for Providing a Visualization Graph."

U.S. Appl. No. 10/927,316, filed Aug. 27, 2004, entitled "Methods and Systems for Providing a Visualization Graph."

Herman et al., "Graph Visualization and Navigation in Information Visualization: A Survey," IEEE, Jan.-Mar. 2000, pp. 24-43.

Chapter 15: Topic Maps in Knowledge Organization, Jul. 16, 2002, XML Topic Maps: Creating and Using Topic Maps for the Web, Addison Wesley Professional, 43 pages.

Butler, Greg et al., "A Graph Database With Visual Queries for Genomics," Proceedings Trim Size: 9.75 in×6.5 in., Sep. 28, 2004, 10 pages.

Communication from the EPO, dated Jan. 16, 2007 for European Application No. 03 078 583.6—1225, 8 pages.

Communication from the EPO, dated Jan. 17, 2007 for European Application No. 03 078 584.4—1225, 8 pages.

Communication from the EPO, dated Jan. 17, 2007 for European Application No. 03 078 586.9—1225, 8 pages.

Communication from the EPO, dated Jan. 19, 2009 for European Application No. 03 078 583.6—2221, 9 pages.

Communication from the EPO, dated Jan. 20, 2009 for European Application No. 03 077 697.5—2221, 9 pages.

Communication from the EPO, dated Jan. 20, 2009 for European Application No. 03 078 584.4—2221, 10 pages.

Communication from the EPO, dated Jan. 20, 2009 for European Application No. 03 078 585.1—2221, 9 pages.

Communication from the EPO, dated Jan. 20, 2009 for European Application No. 03 078 586.9—2221, 9 pages.

Communication from the EPO, dated Jul. 5, 2004 for European Application No. 03 078 585.1—1225, 4 pages.

Communication from the EPO, dated Nov. 8, 2006 for European Application No. 03 078 585.1—1225, 9 pages.

Communication from the EPO, dated Oct. 26, 2006 for European Application No. 03 077 697.5—1225, 6 pages.

Gansner, Emden R., et al., "An open graph visualization system and its applications to software engineering," Prepared using speauth.cls [Version: 1999/06/11 v1. 1a], Software-Practice and Experience, 1999, pp. 1-29.

Golovchinsky, G. et al., "Subverting structure: data-driven diagram generation," Visualization, 1995, Visualization '95. Proceedings, IEEE Conference in Atlanta, Georgia, Oct. 29-Nov. 3, 1995, Los Alamitos, California, pp. 217-223.

Groth, Dennis P., "Visual Representation of Database Queries Using Structural Similarity," Proceedings of the Seventh International Conference on Information Visualization (IV'03), 2003, IEEE, 6 pages.

Halin, Gilles, "An interactive graph visualization for handling cooperative design activity context," The 11th International Conference on CSCW in Design, Melbourne, Australia, 2007, pp. 1-5.

Huang, Mao Lin, "Information Visualization of Attributed Relational Data," 2001, Australian Computer Society, Inc. This paper appeared at the Australian Symposium on Information Visualization, Sydney, Dec. 2001. Conferences in Research and Practice in Information Technology, vol. 9, 7 pages.

Hull, R. et al., "Semantic database modeling: survey, applications and research issues," ACM Computing Surveys, ACM, New York, NY, Sep. 1, 1987, pp. 201-260.

Marshall, Scott, Methods and Tools for the Visualization and Navigation of Graphs, 2001, Universite Bordeau 1, Bordeaux, France, 78 pages.

Moreland, Kenneth et al., "Massive Graph Visualization: LDRD Final Report," Oct. 2007, 48 pages.

Mutton, Paul et al., "Visualization of Semantic Metadata and Ontologies," Proceedings of the Seventh International Conference on Information Visualization (IV'03), 2003, IEEE, 6 pages.

Nguyen, Quang Vinh, et al., "A space-optimized tree visualization," Information Visualization, 2002, INFOVIS 2002, IEEE Symposium, Oct. 28-29, 2002, 8 pages.

Partial European Search Report for European Application No. 03 077 697.5—1225, dated Jun. 18, 2004, 5 pages.

Sheth, Nihar et al., "Visualizing MeSH Dataset Using Radial Tree Layout," Published on Apr. 29, 2003, pp. 1-11.

Staszak, C., "Semantic Network Picture Book," 2002, pp. 1-14.

Wills, Graham J., "NicheWorks—Interactive Visualization of Very Large Graphs," 1999, pp. 190-212, XP007906624, Retrieved from the Internet: URL:http://www.amstat.org/PUBLICATIONS/jcgs/pdf99/wills.pdf>, 23 pages.

* cited by examiner

METHODS AND SYSTEMS FOR PROVIDING A VISUALIZATION GRAPH

This application is based upon and claims the benefit of priority from prior patent application EP 03077697.5, filed Aug. 29, 2003, and prior patent application EP 03078586.9, filed Nov. 14, 2003, the entire contents of each which are expressly incorporated herein by reference.

BACKGROUND

I. Technical Field

The present invention relates to a methods and systems for providing a visualization graph on a computer.

II. Background Information

Visualization graphs are tools that allow data to be handled and displayed on a display device according to certain criteria. The primary objective of navigation graphs is to display systems of complex interrelationships between entities, such as in a database or on the World Wide Web. Visualization graphs can be based on a semantic net including all entity types that occur where the considered entities are linked to each other by various kinds of relations. A visualization graph represents entities as boxes, often referred to as "nodes" of the graph, and relations as lines between the boxes.

A common way of solving the problem of graphical layout is to apply a physical simulation where all entities are treated as masses repulsing each other and the relations are treated as elastic lines trying to pull connected entities together. By double-clicking on a box, other entities that are directly related to the corresponding entity (but which may not yet in the graph) and their relations to other entities in the graph are included. In some implementations the double-clicked entity then moves to the center of the graph (it becomes the "focus" entity) and other nodes, which are too distant (measured in number of relations on the shortest path) from it are removed from the graph.

However, conventional visualization graphs suffer drawbacks. One problem with conventional visualization graphs is that the user can only see a certain number of entities at once and thus potentially misses important related entities. This is limiting in terms of the information the user can acquire from the system. Therefore, it is an object of the present invention to address the problems encountered in conventional visualization graphs. In particular, the present invention provides for selection and visualization of relevant connections within complex interrelationships, for example in a semantic net, in a graph, in a flexible manner, allowing the display to be used in an efficient manner.

SUMMARY

Consistent with the present invention, a method provides a visualization graph on a computer. The method comprises storing data corresponding to a plurality of entities and/or nodes, wherein a semantic net includes the entities and/or nodes and wherein the entities and/or nodes are linked to each other by a plurality of relations, generating a query; performing the query on the data, and outputting at least two of the plurality of data in the form of a visualization graph representing the results of the query, wherein the graph has a focus entity or node defined by a user or the query; and using context information to determine at least one entity and/or node to be output in the results which is indirectly related to the focus.

By providing the possibility to display entities that are indirectly related to the "focus" entity based on the current context, the user is able to collect additional information even if there is no direct relationship between those entities and the focus entity. Thus, the user may "jump" from context to context within the graph. The present invention allows a user to find relevant connections in large amounts of data. The user is also able to navigate and explore knowledge domains in a visual way.

Consistent with the present invention, a computer provides a visualization graph. The computer comprises a database for storing data corresponding to a plurality of entities and/or nodes, wherein a semantic net includes the entities and/or nodes and wherein the entities are linked to each other by a plurality of relations; a storage medium having recorded therein processor readable code processable to provide a visualization graph, the code including a query code processable to perform a query on the database; an output device for outputting at least two of the plurality of data in the form of a visualization graph representing the results of the query, wherein the graph has a focus entity or node defined by a user or the query, wherein the code further includes context code processable to express context information which is processable to determine at least one entity and/or node to be output in the results which is indirectly related to the focus.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 5:
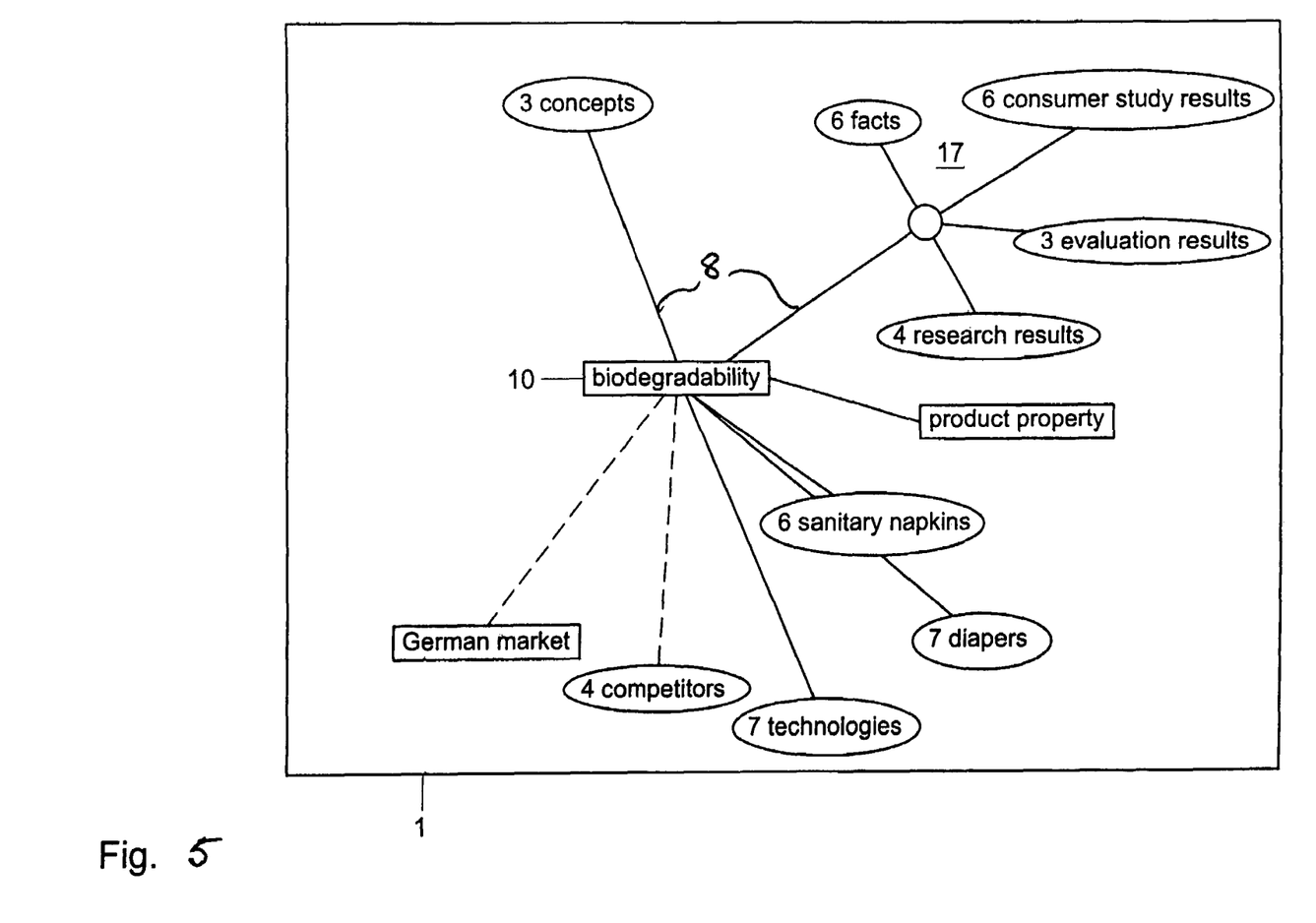
Figure 6:
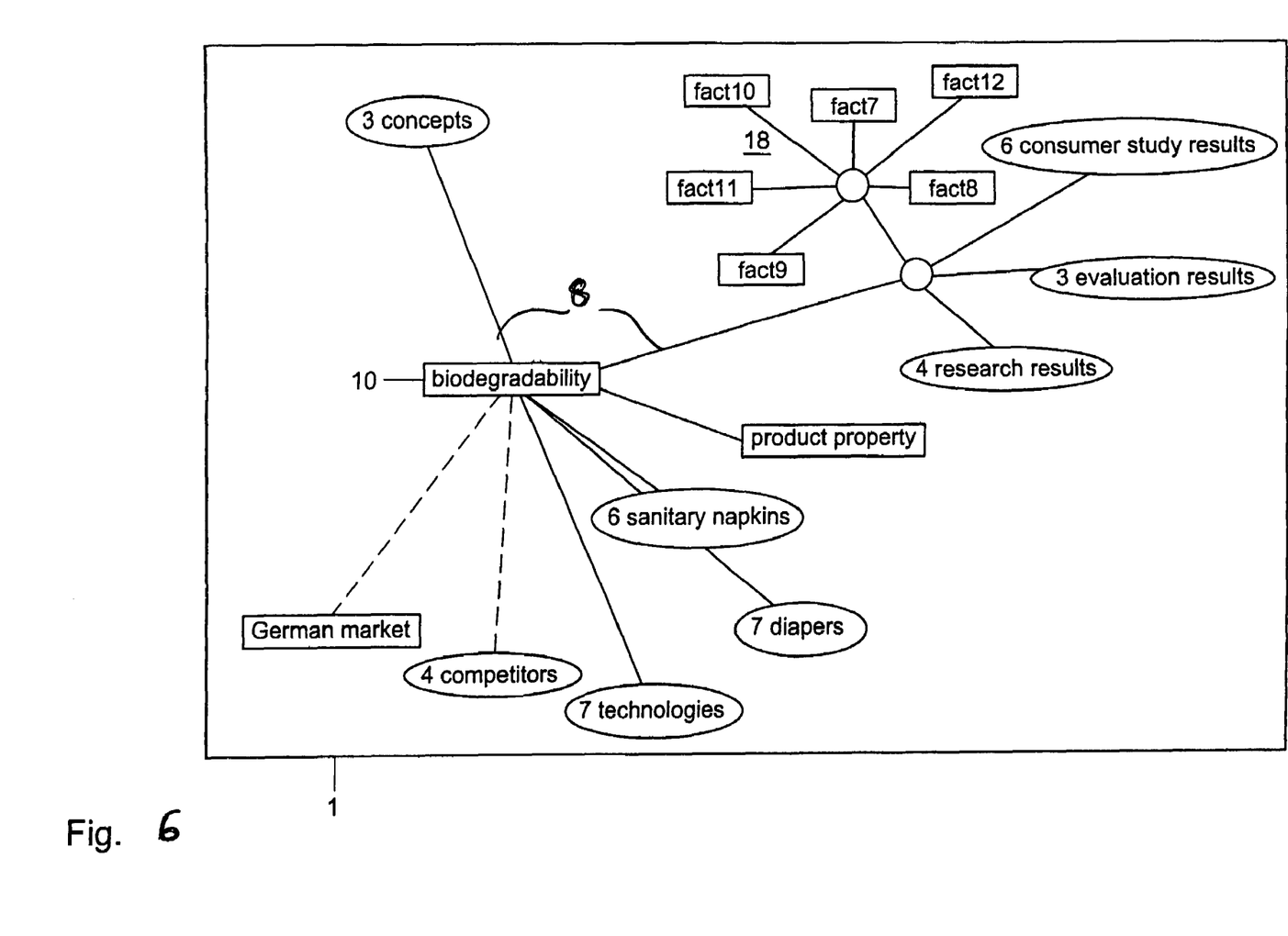
Figure 7:
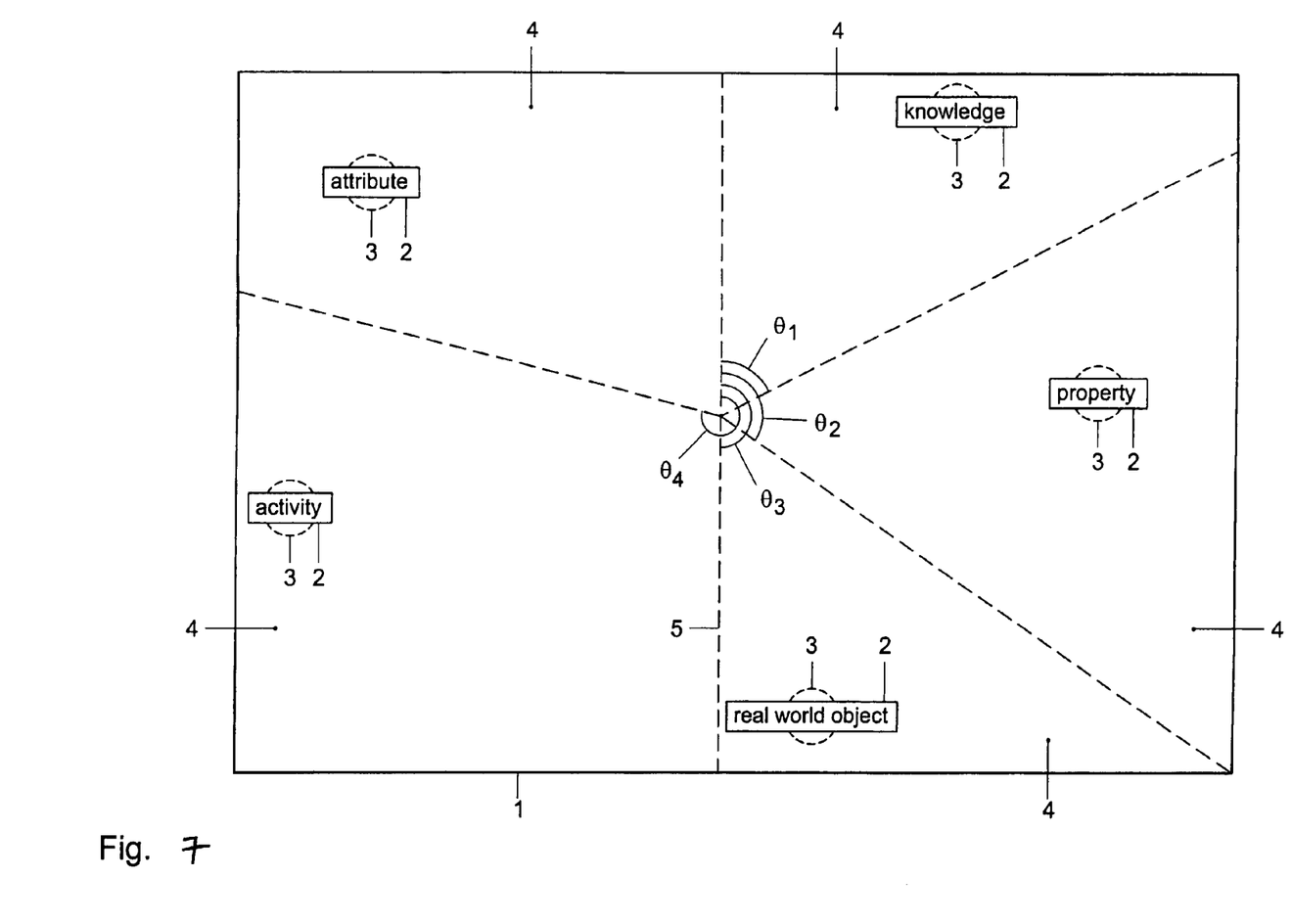
FIG. 7 shows a visualization graph according to a further embodiment of the present invention.
Figure 8:
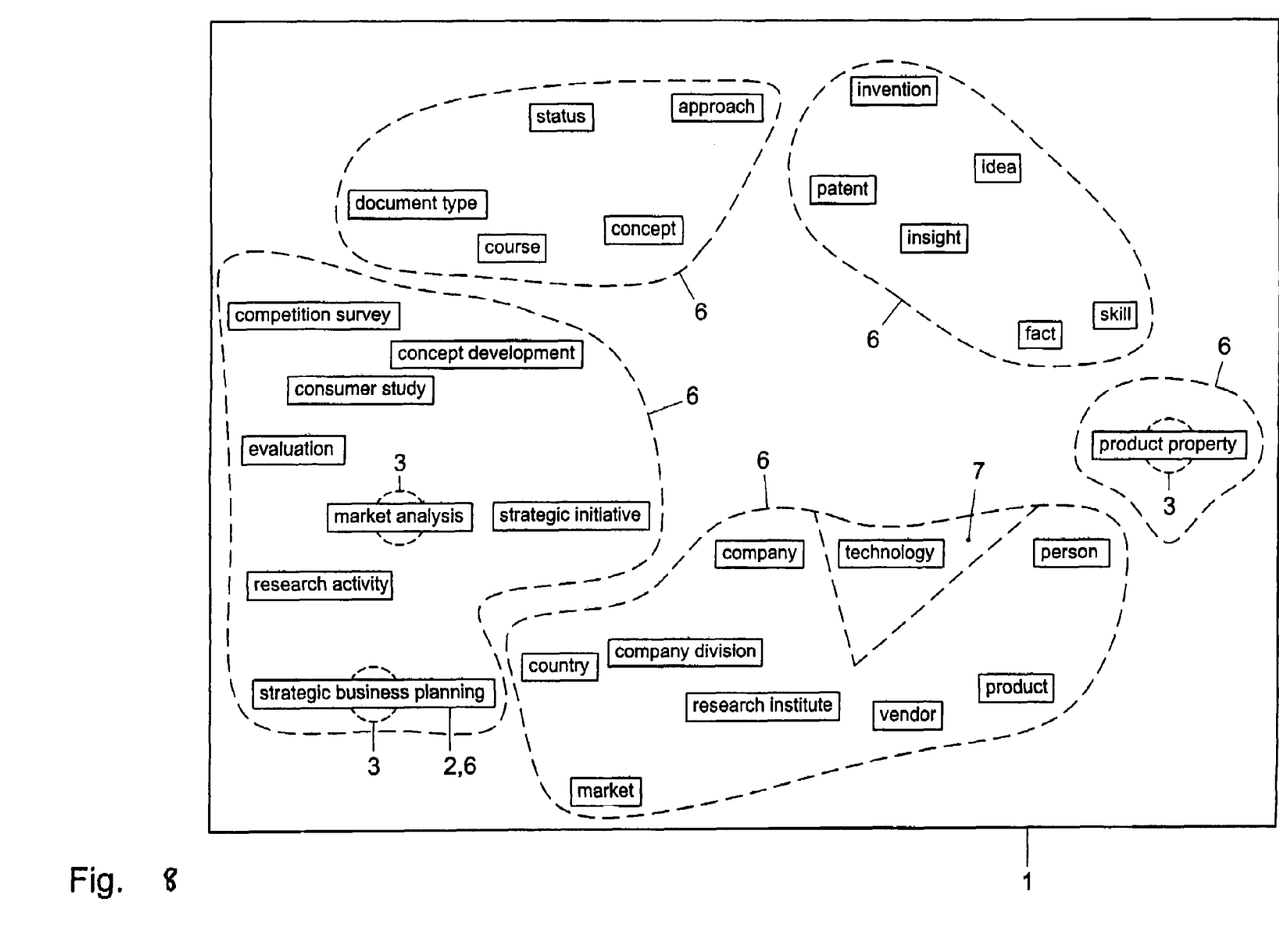
FIG. 8 shows further details of the visualization graph shown in FIG. 7.

FIGS. 1-8 show visualization graphs. FIG. 7 shows details of a visualization graph 1 wherein a plurality of entities 2 are displayed. Each entity is represented by a square box. The entities 2 shown in FIG. 7 represent top level types, referred to hereinafter as types. FIG. 8 shows details of a visualization graph 1 wherein a plurality of sub-entities are displayed. Each sub-entity is represented by a square box. The sub-entities shown in FIG. 8 represent second level entity types, hereinafter referred to as sub-types.

Figure 1:
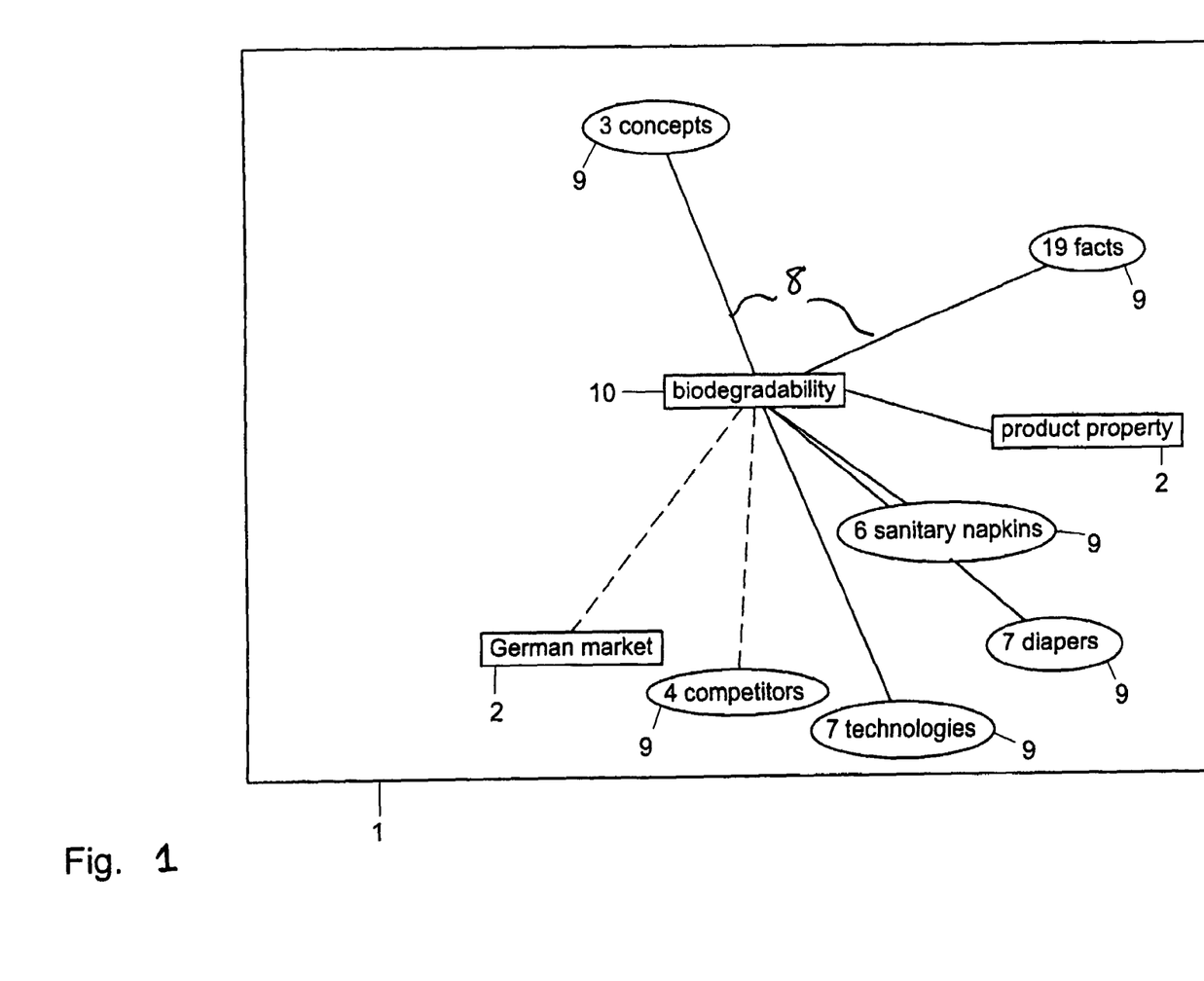
FIG. 1 shows a grouping in a visualization graph.

The entities 2 and sub-entities are typically modeled as a mass. A repulsive force is exerted by a repulsor between each pair of entities. The repulsive force may be inversely proportional to the distance or the square of the distance, or any other inverse relationship. The relations 8 between entities (not shown in FIG. 7) are modeled as springs and are typically linear springs. The model provides damping to ensure that the system converges. When energy is put into the system, for example, when entities 2 are introduced into the graph or moved, the system is modeled to adopt the lowest energy level. For each entity or node (as shown in FIG. 1), the distance and repulsive force is calculated from other entities and nodes. The forces are added to obtain a force vector. The reaction of the system in terms of acceleration and deceleration is dependent on the force vector.

Groups of entities sharing at least one relation 8 may be bundled together and displayed as a node 9, as seen in FIG. 1. Nodes and entities may be displayed together on the same graph as seen in FIG. 1, wherein relations 8 common to entities and nodes are displayed as a line linking the appropriate entities and/or nodes.

A graph may be arranged so that the relations 8 with respect to a particular entity 2 or node 9 are displayed. In this case, the entity 2 or node 9 in question, is referred to as the focus entity or node 10 and is typically displayed in a central region of the graph. As described in more detail below, entities or nodes 2, 9 which are distant from the focus entity or node 10 in relation 8 terms, may nevertheless be shown on the graph, if they are considered to be of special interest in the current context.

FIG. 1 shows grouping in a visualization graph. In particular, FIG. 1 shows a focus entity 10 with related entities 2 and those comprised in nodes 9, clustered by entity type. The dashed lines indicate indirectly related items, such as "competitors" and "market," selected due to user preferences.

Figure 2:
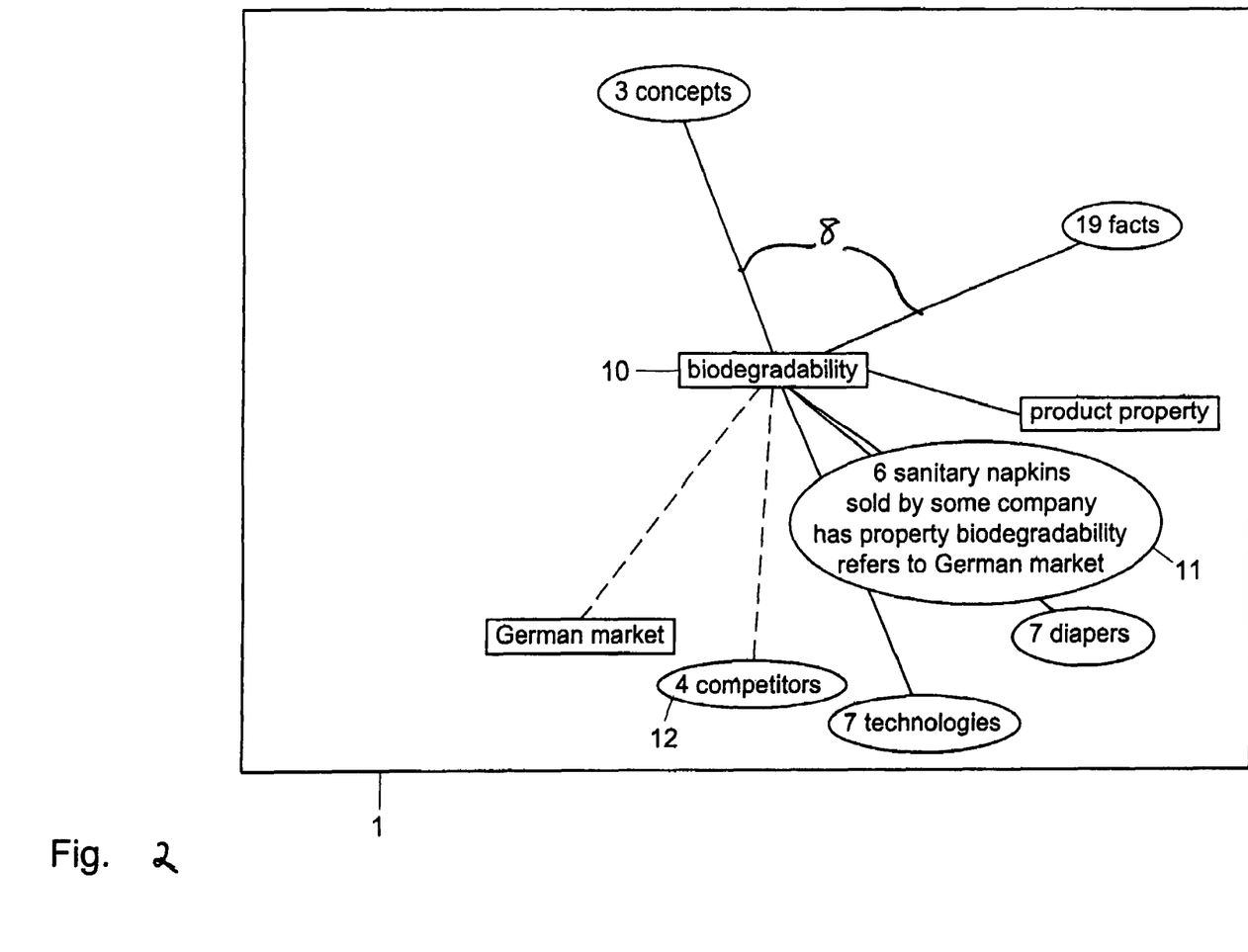
FIG. 2 shows further details of the visualization graph shown in FIG. 1.

FIG. 2 shows further details of the visualization graph shown in FIG. 1. In particular, FIG. 2 depicts a display of a group's common relations 8 as indicated when a mouse, or other indicator adapted for use with a computer, is passed over the desired node (MouseOver).

As shown in FIGS. 1 and 2, to avoid causing a visualization graph 1 to become crowded and the data complex to navigate, groups of entities 9 with common relations 8 are bundled and displayed as group nodes 9 (as shown in FIG. 1). The common relation 8 of the entities of a particular group node defines the focus entity. Of all possible groupings those are selected which result in the most even distribution of entities 2 (also referred as elements) over the groups and which form groups of entities 2 (elements) that have at least two relations 8 in common.

The common relations 8 may be explicitly assigned to each entity in a group, but they may also be abstractions of the individual relations 8. This embodiment is shown in FIG. 2, where the common relations 8 of the group "sanitary napkins" are displayed. Each of these products has a relation 8 "refers to German market" and a relation 8 "has property biodegradability." These are direct relations 8. For example, a company with access to the graph sells two products in the group. Competing companies sell the remaining products. Since the semantic net contains the information identifying the companies, a common abstract relation 8 "is sold by some company" is created, which also characterizes the elements of the group.

The selection code is dynamic and results in a dynamic grouping of the entities. That is, depending on certain criteria such as the context defined by context information, the selection and abstraction, if applied, may at different times provide different groupings.

To further improve the predictability of the selection, facets are introduced. In particular, to increase the predictability with regard to what common relation 8 will be chosen as criterion to form groups, the user may define facets for each entity type. "Types" are discussed in more detail below with reference to FIGS. 7 and 8. Facets are predefined groups that are characterized by the entity type of their elements or the kind of relation 8 that connects their elements to the focus entity 10.

In this example, the following facets have been defined for product properties: knowledge, products, technologies, persons, life cycle phases, companies, ideas, insights, facts, concepts, approaches, activities. If facets are defined, all entities related to the focus entity will be sorted into the corresponding facets (groups) and the dynamic grouping algorithm is used only to subdivide these facets into smaller groups (if possible).

Figure 3:
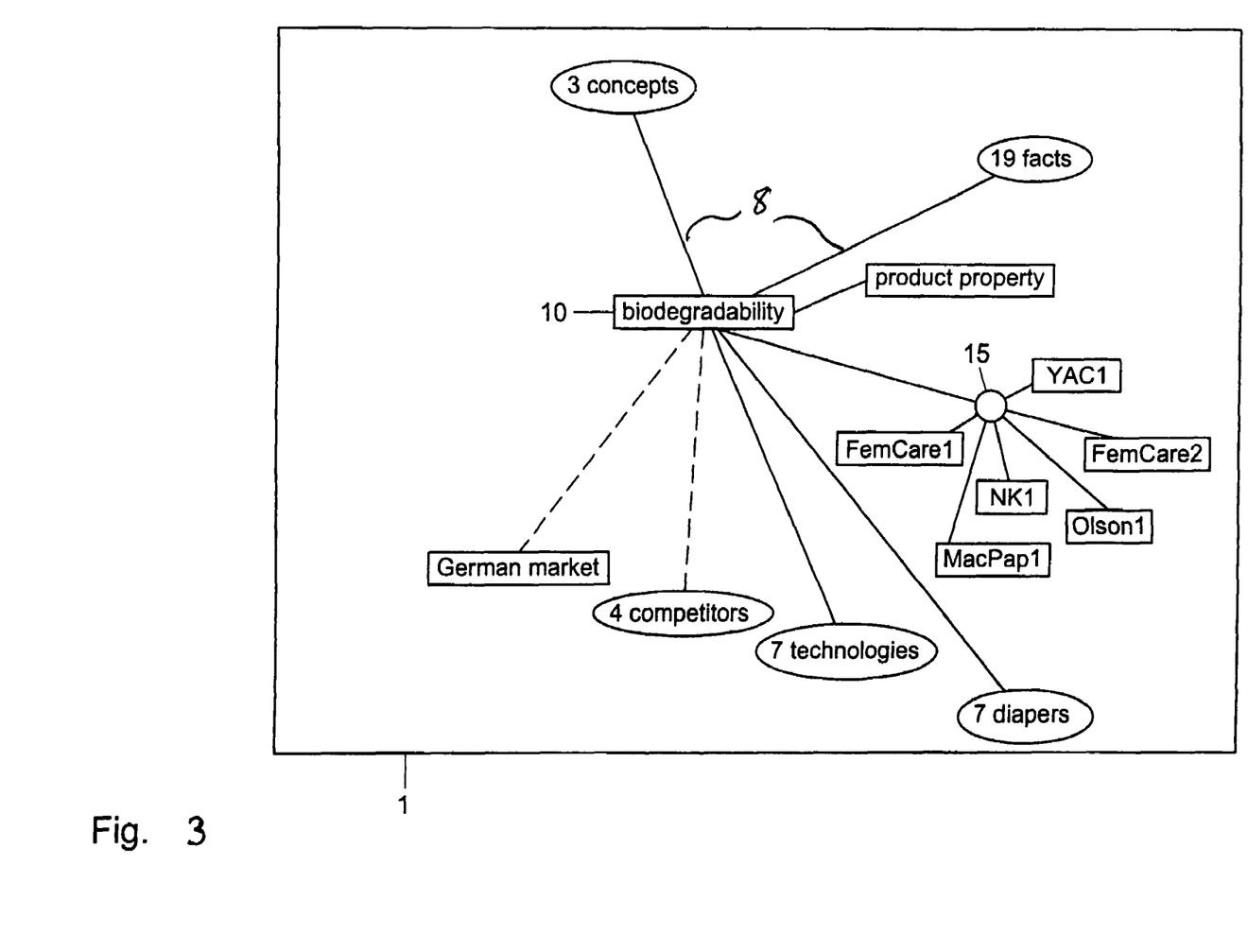
FIGS. 3-6 show visualization graphs according to embodiments of the present invention.
Figure 4:
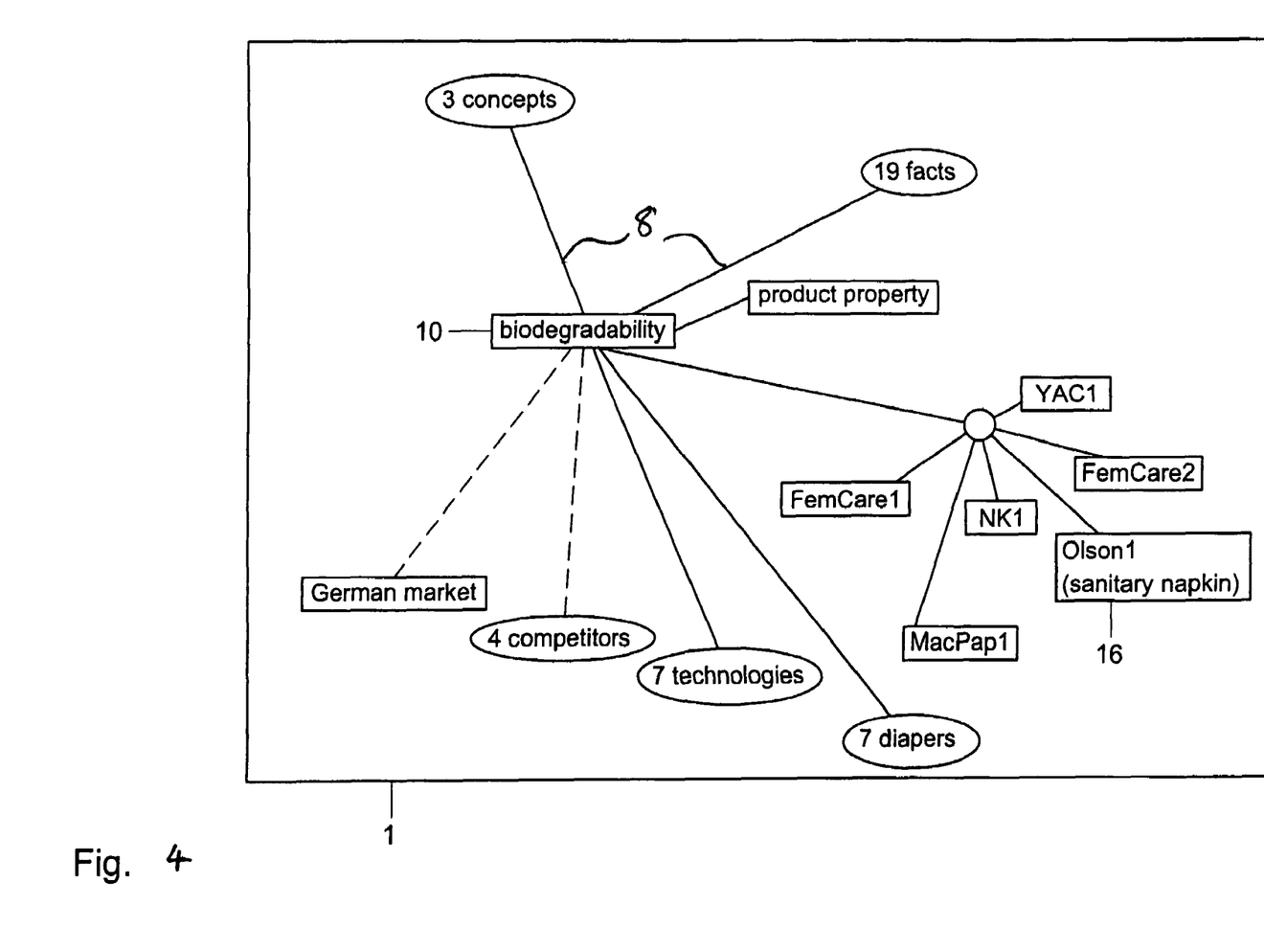

FIGS. 3-6 show visualization graphs according to embodiments of the present invention. In particular, FIG. 3 depicts an exploding group 15, wherein association of members to group remains visible. FIG. 4 depicts a display of entity type 16 as viewed with the MouseOver function. FIG. 5 depicts an explosion of a group into subgroups 17. FIG. 6 depicts the explosion of a subgroup 18.

In contrast to conventional visualization graphs, the present invention allows the formation of groups in a 2D visualization graph while maintaining clarity. According to an embodiment of the present invention, this is achieved by keeping the space required for the nodes minimal and the origin of the added nodes traceable. Further, the graph is rearranged in a smooth way to avoid confusion of the user.

According to an embodiment of the invention, the following steps are taken: before exploding, the group node increases repulsive force proportionally to the number of entities to be inserted in order to make room for the new nodes. The actual insertion begins, when the neighbor nodes have moved sufficiently far away. Although the new nodes inserted into to the graph have a direct relation 8 to the "focus" node 10, this relation 8 is only displayed indirectly. The new entities are connected to the group node that remains in the graph as "bundler" without label and establishes the relation 8 to the "focus" node 10. Thus, the number of lines connected to the focus node 10 remains low.

While a group "bundler" node 11 does not have a label in order to save space, the group's characteristics are shown when the user moves the mouse pointer over the "bundler" node 11, in the same way as shown in FIG. 2.

Double-clicking a "bundler" node 11 causes group to collapse again into one node. The recursive explosion and collapsing of subgroups 18 is also possible (FIGS. 5, 6). he resulting representation looks and behaves similar to a "tree view control." The main difference is that a tree view represents an existing hierarchical structure, whereas the group nodes in the graph dynamically create a hierarchy-like structure in order to get a clearer graph layout. Also, the problem of finding a 2D graph layout does not exist for conventional tree view controls.

In contrast to conventional visualization graphs, in a further embodiment of the present invention, the visualization graph layout is such that the number of nodes is kept low without missing out potentially relevant information. According to an embodiment of the present invention this is achieved in the following way. When the focus of a graph changes, new related entities are inserted, and therefore other entities have to be removed. In conventional visualization graphs, only nodes in the graph are kept which have a distance $d<d_{max}$ from the focus node, where the distance is the number of relations 8 on the shortest path between a node 9 and the focus node 10. Since the number of nodes usually increases exponentially with $d_{max}$, a value of 1 or 2 is appropriate for most purposes.

To enhance navigation of the visualization graph 1, entities of certain types may be included in the graph even if they are far more distant to the focus 10, if they are considered to be of special interest with respect to the current context information either due to their entity type or due to the kind of relations 8 linking them to the focus node 10. The context information defines what is displayed in the graph 1, and is determined in accordance with those aspects of the data, a user may want to access. The context information in this case can be made up, but is not limited, from the following components: current user's general preferences, context information attached to the "focus" node, and current user's current role and/or session history.

In FIGS. 1-6, the entity 2 "German market" and a group of "four competitors" 12 appear in the graph connected with dashed lines to the focus node 10. These entities 12 have no direct relation 8 to the product property "biodegradability," but are related via some products. In this example, the system has been told that if an entity of the type "product property" is in the focus, markets and competitors are of special interest. Accordingly, all markets and competitors in a certain distance $d<4$ to the entity "biodegradability" are selected and inserted into the graph.

More sophisticated algorithms may be applied to find entities of special interest and it is even possible to let the user create context specific algorithms by means of a scripting language or macro recorder. In a preferred embodiment, the context information enables identification of at least one entity and/or node 2, 9 having a particular interest with respect to the focus 10. By enabling identification of at least one entity 2 or node 9 having a particular interest with respect to the focus 10, navigation is enhanced, because entities of certain types may be included in the graph 1 even if they are far more distant to the focus 10. Further, the context information may identify a particular interest on the basis of an entity or node type or due to the relations 8 linking the entity and/or node 2, 9 to the focus 10. In doing so, the context information allows the data to be navigated in a more flexible way, which yields results that would remain undetected in conventional graphs. Also, the context information may be defined by at least one predetermined user preference. This allows the user's knowledge of particular interests to be exploited to obtain results that might otherwise be ruled out in view of the distance in terms of the number of relations 8 between certain entities and/or nodes.

In an alternative embodiment, the context information may be defined by information associated with the focus 10. This means that not only are the relations 8 of the focus entity or node 2, 9 taken into account, but also information which may be unrelated to the relations 8 of the focus entity or node 10. Alternatively or additionally, the context information is defined by a user's current role and/or session history. This provides yet further flexibility in the results obtained is achieved, allowing results to be observed which would be missed in conventional systems.

FIGS. 7 and 8 show further embodiments of the present invention. In particular, FIG. 7 shows the position of attractors for top-level entity types, also referred to as "types" and FIG. 8 shows the approximate position of attractors for second-level entity types, also referred to as "sub-types." FIG. 7 shows details of a visualization graph 1 wherein a plurality of entities 2 are displayed. Associated with each entity is an attractor 3. The attractors do not appear on the graph to a user, but are schematically depicted as dotted circles 3. To facilitate orientation, certain types (or kinds) of entities 2 are arranged to appear in the same sector 4 of the graph 1.

According to further embodiments of the present invention, a 360° approach is proposed. A first further embodiment is based on a non-deterministic approach, using attractors and repulsors. A second further embodiment, is based on a deterministic approach using a dynamic, but deterministic, subdivision of the screen and screen areas into sectors and sub-sectors, wherein entity types are allocated to sectors and entity sub-types are allocated to sub-sectors, respectively.

A first further non-deterministic embodiment is now described. To facilitate orientation certain kinds, such as types, of entities 2 are arranged to appear in the same sector 4 of the graph. Invisible attractors 3, that are not visible to a user of the graph, are introduced in the graph for each entity type. In the example shown in FIG. 1 the types are: "attribute," "knowledge," "property," "real world object" and "activity." These types may be referred to as top-level entity types. The angle theta 1-theta 4 of each attractor 3 with respect to a reference may be set by customizing and is inherited by all subtypes.

FIG. 8 depicts subtypes 6, wherein subtypes are entities 2 which have a type falling within the scope of a top-level type. For example, in FIG. 8 "strategic business planning" is a sub-type of "activity." It is seen in FIGS. 7 and 8 that within each sector 4, 7 the entities to be placed are arranged in FIG. 7 in an ellipse, whereas in FIG. 8, because there are more entities to be arranged, and thus force vectors are more complex, in each sector 4, the sub-type entities, rather than being arranged in an ellipse are arranged in a more nebulous arrangement. Further, because the force vectors are more complex in FIG. 8, where a large number of entities are located in a relatively small area, the location of each entity does not correspond exactly to the location of its respective attractor, because the repulsive forces between entities also play a role in the location of the entity. Thus, FIG. 8 shows the approximate location of the attractors 3 as dotted lines.

It will be understood that the negotiation of sector size determined in accordance with the number of entities and how they are to be distributed causes the graph to have a particular fuzziness. As mentioned, this is achieved by the provision of the attractors 3. In contrast, in conventional graphs, there is no flexibility in the system to expand or contract a sector beyond or within its boundary, respectively, should the need arise when entities are either added or taken away from the sector.

A second further deterministic embodiment is now described. The principle of the second further embodiment may be used to arrange nodes (refer to FIG. 8) in a navigation graph without the use of repulsors and/or attractors. According to a second further embodiment of the present invention, the following steps are carried out. The display, which is typically a computer screen, is divided into sectors 4 assigned to the respective top-level entity types 2. The size of each sector depends on the number of entities or nodes it contains, including all visible subtypes 6. For example, if a larger number of entities are to be placed in a particular sector, that sector will become larger. The sectors are next recursively divided into subtype sectors 7 and again, their relative size depends on the number of entities they contain. The segmentation of the screen is repeated each time that entities are added to or removed from the graph 1. The distance of the entities or nodes to the center of the graph is an oscillating function of the angle in order to avoid collisions (which in the simulative approach are avoided by the repulsive force between entities). It will be understood that although the first and second further embodiments may be alternatively implemented, a combination of the first and second embodiments may also be implemented.

Figure 9:
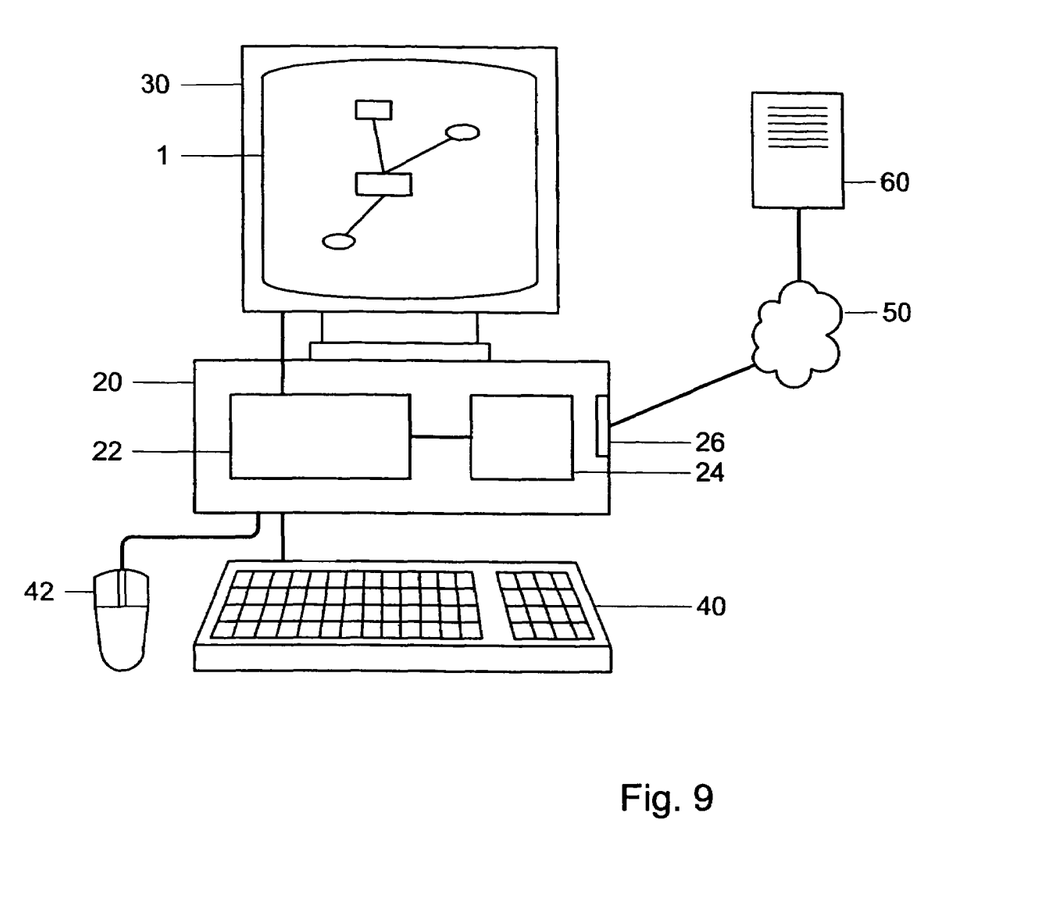
FIG. 9 shows an exemplary computer for carrying out the methods according to embodiments of the invention.

FIG. 9 shows a typical computer arrangement for carrying out the methods according to embodiments of the invention. In particular, FIG. 9 shows a computer 20 including a central processing unit (CPU) 22. The computer further includes a storage medium, which may be located in the CPU 22 and/or elsewhere. In the storage medium processor readable code is stored, which may be read by the CPU 22 to provide a visualization graph.

Various codes may be stored the code may include selection code processable to select those entities from the plurality of entities having a common relation 8 and storing the selected entities as a plurality of groups, representation code processable to represent the groups on the graph as a plurality of nodes, wherein only those relations 8 which all of the nodes have in common are represented, abstraction code processable to abstract the relations 8 to identify the common relation 8. The code may further include representation code processable to represent a plurality of entities having a common relation 8 as a node 9 on the visualization graph, and in response to a predetermined stimulus causing the entities comprised at the node 9 to be displayed, and in response to a further predetermined stimulus causing the graph 1 to restructure so that the entities 2 displayed are replaced by the node 9.

Also provided is a display device 30, such as a screen, for displaying visualization graph 1. The user may use a keyboard 40, mouse 42 or other operating device to communicate with the computer 20 and to instruct the computer to perform a query. The query may be generated automatically or by a user. Context information may be defined in the query. Alternatively, it may not be defined in the query, but may be defined in some other way, such as, for example, user preferences in order to evaluate indirect relatedness. In such as case, it may operate either on the data base or on the results of the query.

In one embodiment, a computer 20 is provided for providing visualization graph 1. The computer 20 comprises a database 24, 60 for storing data corresponding to a plurality of entities and/or nodes 2, 9, wherein a semantic net includes the entities and/or nodes 2, 9 and wherein the entities and/or nodes 2, 9 are linked to each other by a plurality of relations 8, a storage medium 22 having recorded therein processor readable code processable to provide a visualization graph 1, the code including a query code processable to perform a query on the database, an output device 30 for outputting at least two of the plurality of data in the form of a visualization graph 1 representing the results of the query, wherein the graph 1 has a focus entity or node 10 defined by a user or the query, wherein the code further includes context code processable to express context information which is processable to determine at least one entity and/or node to be output in the results which is indirectly related to the focus 10.

Further, the context code may be processable to allow at least one entity and/or node 2, 9 to be output in the results that are indirectly related by more than two relations 8. The context code may also be processable to enable identification of at least one entity and for node 2, 9 having a particular interest with respect to the focus 10, and/or may be processable to identify a particular interest on the basis of an entity or node type or due to the relations 8 linking the entity and/or node to the focus 10.

Further, the context code may be determined by any or a combination of at least one predetermined user preference, information associated with the focus 10, or a user's current role and/or session history query. In further embodiments of the present invention, further codes may be stored, such as an allocator code processable to allocate the entities to a predetermined sector of the graph depending on their entity type, additional entity allocator code processable so that if an additional entity of a particular entity type is stored in a storing step, the location on the graph of the allocated entities are adapted in accordance with the additional entity. The allocator code may include a plurality of attractor codes processable to attract the entities to a predetermined sector of the graph depending on their entity type, respectively, a plurality of repulsor codes processable to repulse the entities allocated to the predetermined sector from one another. The attractor codes and the repulsor codes are processable so that the location of an entity on a graph is determined by the sum of the influence exerted on the entity by the attractor code and the repulsor codes.

The allocator code may further comprise dividing code processable to divide the graph into sectors 4, wherein an entity 2 is allocated to one of the sectors 4 according to its entity type, and further dividing code processable to further divide the sectors 4 into sub-sectors 7, wherein an entity 2 is allocated to one of the sub-sectors 7 in accordance with its entity sub-type, wherein the size of the sectors 4 and the sub-sectors 7 is determined in accordance with the number of entities of a particular type allocated to the sector 4 and the number of entities of a particular sub-type allocated to the sub-sector 7, respectively.

The allocator code may also include repeater code processable to activate the dividing code if the number of entities to be displayed on a graph changes. The processable code may further comprise selection code processable to select those entities from the plurality of entities having a common relation 8 and storing the selected entities as a plurality of groups, representation code processable to represent the groups on the graph as a plurality of nodes, wherein only those relations 8 which all of the nodes have in common are represented.

In one embodiment, the database 24 storing data for building the graph may be located locally at the computer 20. Alternatively or additionally, the database 60 or an additional database may be located remotely from the computer 20. In such an embodiment, the computer is provided with means to remotely access a remote database. For example, using a modem 26 connected via the Internet 50 or other network or communications link to the remote database 60. Although the embodiment shown in FIG. 9 is a typical Internet configuration, other configurations may also be possible. As mentioned, a stand-alone configuration is also consistent with the present invention. Further, the database may be distributed over more than one computer. While parts of the processing may be performed on the user's computer, other parts of the processing may be performed remotely at a remote computer.

In the embodiments of the present invention described above, the visualization graph is concerned with aspects of company dealing with personal hygiene products. However, the invention is not limited in this respect. The present invention finds application for navigating any kind of data. In particular, where complex interrelationships of data are to be navigated. Further applications are found where data in one or more databases is somehow related to one another. Further applications include Internet applications, where metadata is accessed and used. The expression "visualization graph" is intended to cover visual representations, such as navigation graphs and other such tools.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method of providing a visualization graph on a computer comprising:
    storing data corresponding to nodes in a memory device, wherein a semantic net includes the nodes and wherein the nodes are linked to each other by relations;
    generating a query;
    performing the query, by a computer processor, on the stored data and determining result nodes;
    determining a predetermined distance as a number of relations on a shortest path between a particular result node and a focus node, wherein the result nodes outside the predetermined distance are not displayed on a visualization graph unless they are of particular interest and wherein the predetermined distance is more than one relation; and
    displaying on a display device the visualization graph representing results of the query by displaying a subset of the result nodes, the visualization graph including:
        the focus node, defined by a user or the query;
        a first result node that is directly related to the focus node;
        a second result node that is indirectly related to the focus node and is within the predetermined distance from the focus node, and
        a third result node that is indirectly related to the focus node and is outside the predetermined distance from the focus node yet which is displayed because it is of particular interest, wherein the query uses context information to determine that the third result node is of the particular interest with respect to the focus node, and wherein the context information identifies the particular interest on the basis of a node type or relations linking the third result node to the focus node,
    wherein the results of the query comprise a fourth result node that is indirectly related to the focus node, and
    wherein the fourth result node is not displayed in the visualization graph because it is outside the predetermined distance and is not determined to be of particular interest.

2. The method of claim 1, wherein the context information is defined by at least one predetermined user preference.

3. The method of claim 1, wherein the context information is defined by information associated with the focus node.

4. The method according to claim 1, wherein the context information is defined by a user's current role and/or session history.

5. The method according to claim 1, wherein the predetermined distance further comprises a number of relations between an indirectly related result node and the focus node.

6. The method according to claim 1, wherein the context information comprises at least one of user preference, information attached to the focus node, user role, or session history.

7. A computer for providing a visualization graph, comprising:
    a database configured to store data corresponding to nodes, wherein a semantic net includes the nodes and wherein the nodes are linked to each other by relations;
    a storage medium having recorded therein processor readable code processable to:
        provide a visualization graph,
        perform a query on the database to determine result nodes, and
        determine a predetermined distance as a number of relations on a shortest path between a particular result node and a focus node, wherein the result nodes outside the predetermined distance are not displayed on the visualization graph unless they are of particular interest, and wherein the predetermined distance is more than one relation; and
    an output device configured to display the visualization graph representing results of the query by displaying a subset of the result nodes, the visualization graph including:
        the focus node, defined by a user or the query;
        a first result node that is directly related to the focus node;
        a second result node that is indirectly related to the focus node and is within a predetermined distance from the focus node; and
        a third result node that is indirectly related to the focus node and is outside the predetermined distance from the focus node yet which is displayed because it is of particular interest, wherein the code further includes context code processable to express context information which is processable to determine that the third result node is of particular interest with respect to the focus node, wherein the context information identifies the particular interest on the basis of a node type or relations linking the third result node to the focus node
    wherein the results of the query comprise a fourth node that is indirectly related to the focus node, and
    wherein the fourth node is not displayed in the visualization graph because it is outside the predetermined distance and is not determined to be of particular interest.

8. The computer according to claim 7, wherein the context code is determined by at least one predetermined user preference.

9. The computer according to claim 7, wherein the context code is determined by information associated with the focus node.

10. The computer according to claim 7, wherein the context code is determined by a user's current role and/or session history.

11. The computer according to claim 7, wherein the predetermined distance further comprises a number of relations between an indirectly related result node and the focus node.

12. The computer according to claim 7, wherein the context information comprises at least one of user preference, information attached to the focus node, user role, or session history.

13. A program storage device readable by a processing apparatus, the device embodying instructions executable by a processor to perform the steps of:

storing data corresponding to nodes in a memory device, wherein a semantic net includes the nodes and wherein the nodes are linked to each other by relations;

generating a query;

performing the query, by a computer processor, on the stored data and determining result nodes;

determining a predetermined distance as a number of relations on a shortest path between a particular result node and a focus node, wherein the result nodes outside the predetermined distance are not displayed on a visualization graph unless they are of particular interest and wherein the predetermined distance is more than one relation; and     displaying on a display device the visualization graph representing results of the query by displaying a subset of the result nodes, the visualization graph including:

the focus node, defined by a user or the query;

a first result node that is directly related to the focus node;

a second result node that is indirectly related to the focus node and is within the predetermined distance from the focus node; and         a third result node that is indirectly related to the focus node and is outside the predetermined distance from the focus node yet which is displayed because it is of a particular interest, wherein the query uses context information to determine that the third result node is of particular interest with respect to the focus node, wherein the context information identifies the particular interest on the basis of a node type or relations linking the third result node to the focus node,     wherein the results of the query comprise a fourth result node that is indirectly related to the focus node, and     wherein the fourth result node is not displayed in the visualization graph because it is outside the predetermined distance and is not determined to be of particular interest.

* * * * *

UNITED STATES PATENT AND TRADEMARK OFFICE
CERTIFICATE OF CORRECTION

| | | |
|---|---|---|
| PATENT NO. | : 7,617,185 B2 | Page 1 of 1 |
| APPLICATION NO. | : 10/927458 | |
| DATED | : November 10, 2009 | |
| INVENTOR(S) | : Werner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Nineteenth Day of October, 2010

David J. Kappos
*Director of the United States Patent and Trademark Office*